(12) United States Patent
Dlugoss et al.

(10) Patent No.: US 8,942,883 B2
(45) Date of Patent: Jan. 27, 2015

(54) SENSOR MESSAGING SYSTEMS AND METHODS

(75) Inventors: Randall B. Dlugoss, Royal Oak, MI (US); Paul G. Otanez, Troy, MI (US)

(73) Assignee: GM Global Technology Operations LLC

( * ) Notice: Subject to any disclaimer, the term of this patent is extended or adjusted under 35 U.S.C. 154(b) by 1315 days.

(21) Appl. No.: 12/766,234

(22) Filed: Apr. 23, 2010

(65) Prior Publication Data

US 2011/0153144 A1 Jun. 23, 2011

Related U.S. Application Data

(60) Provisional application No. 61/287,406, filed on Dec. 17, 2009.

(51) Int. Cl.
| | |
|---|---|
| *G01M 17/00* | (2006.01) |
| *G06F 7/00* | (2006.01) |
| *G06F 19/00* | (2011.01) |
| *F16H 59/68* | (2006.01) |
| *F16H 61/12* | (2010.01) |

(52) U.S. Cl.
CPC ............... *F16H 59/68* (2013.01); *F16H 61/12* (2013.01); *F16H 2059/683* (2013.01)
USPC ................ 701/29.1; 701/51; 701/54; 701/55; 701/60

(58) Field of Classification Search
CPC ....... G06F 19/00; B60W 10/00; B60W 10/08; B60W 10/10; G05B 1/11; G05B 19/43
USPC ............. 701/51–66; 475/116–148; 74/730.1, 74/731.1, 732.1, 733.1; 477/156–181; 73/756, 725, 716
See application file for complete search history.

(56) References Cited

U.S. PATENT DOCUMENTS

| | | | | |
|---|---|---|---|---|
| 4,393,732 | A * | 7/1983 | Suzuki et al. ................. | 477/125 |
| 4,489,305 | A * | 12/1984 | Lang et al. .................... | 340/459 |
| 4,500,874 | A * | 2/1985 | Jacobi et al. ................. | 340/607 |
| 4,898,576 | A * | 2/1990 | Philip .......................... | 604/505 |
| 5,602,927 | A * | 2/1997 | Tamamura et al. .......... | 381/71.4 |
| 5,771,861 | A * | 6/1998 | Musser et al. ................ | 123/357 |
| 6,398,227 | B1 * | 6/2002 | Lech et al. ................. | 280/5.515 |
| 7,600,988 | B2 * | 10/2009 | Doerr et al. .................... | 417/417 |
| 2002/0016176 | A1 * | 2/2002 | Glaser .......................... | 455/500 |
| 2002/0128118 | A1 * | 9/2002 | Milender et al. .............. | 477/143 |
| 2006/0259273 | A1 * | 11/2006 | Goldberg ...................... | 702/182 |
| 2007/0010927 | A1 * | 1/2007 | Rowley et al. .................. | 701/51 |
| 2007/0137185 | A1 * | 6/2007 | Muraguchi .................... | 60/289 |
| 2008/0264382 | A1 * | 10/2008 | Kang ............................ | 123/435 |
| 2009/0055126 | A1 * | 2/2009 | Yanovich et al. ............. | 702/179 |
| 2009/0241645 | A1 * | 10/2009 | Rains et al. .................. | 73/53.05 |
| 2009/0254257 | A1 * | 10/2009 | Dlugoss et al. ................. | 701/65 |

* cited by examiner

*Primary Examiner* — Khoi Tran
*Assistant Examiner* — Rachid Bendidi

(57) ABSTRACT

A pressure sensor module for a vehicle includes a sensing element module, a sampling module, a filtering module, and a monitoring module. The sensing element module measures a pressure of a fluid and outputs a pressure signal based on the pressure. The sampling module samples the pressure signal. The filtering module receives at least one filter coefficient from a control module and determines a filtered pressure based on at least one of the samples. The monitoring module receives a condition monitoring request from the control module, receives a predetermined value from the control module, and notifies the control module when a condition is satisfied based on a comparison of the predetermined value and one of the filtered pressure and a parameter determined based on the pressure signal.

20 Claims, 6 Drawing Sheets

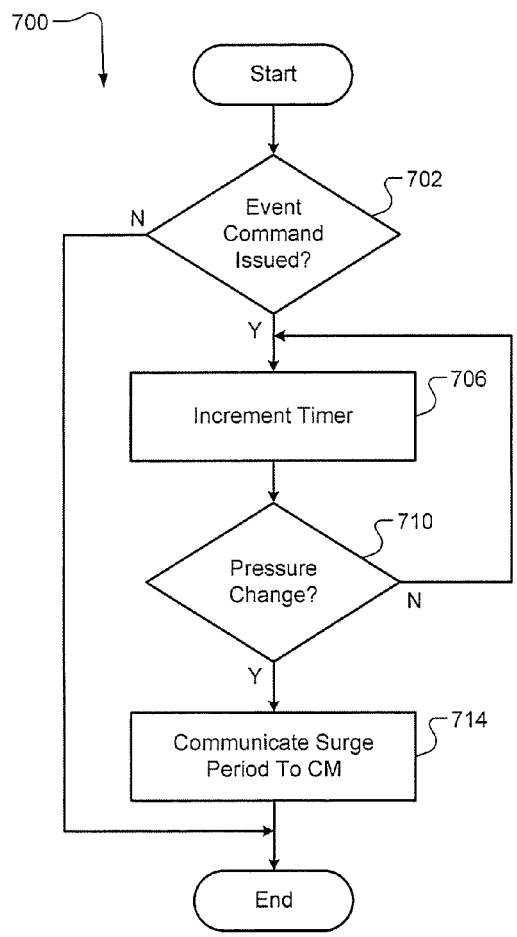
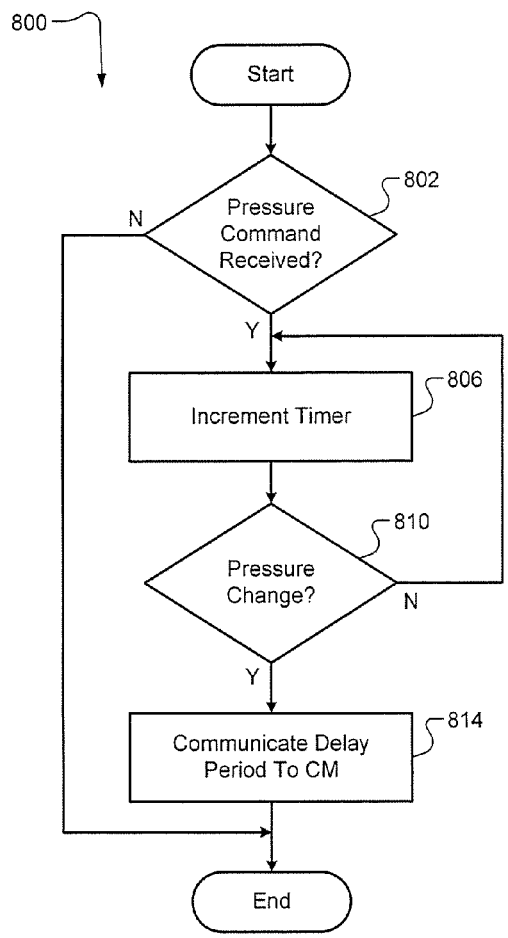
FIG. 7  FIG. 8

SENSOR MESSAGING SYSTEMS AND METHODS

CROSS-REFERENCE TO RELATED APPLICATIONS

This application claims the benefit of U.S. Provisional Application No. 61/287,406, filed on Dec. 17, 2009. The disclosure of the above application is incorporated herein by reference in its entirety.

FIELD

The present disclosure relates to internal combustion engines and more particularly to sensor systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an internal combustion engine that generates drive torque for the vehicle. The vehicle may additionally or alternatively include one or more electric motors. A transmission may receive torque output by the engine and/or the electric motor(s), and the transmission may transmit torque to one or more wheels of the vehicle via a driveline.

The vehicle may include various sensors. A given sensor measures a parameter and generates a signal based on that parameter. A control module receives the signal and may sample the signal at a predetermined sampling rate. The control module may also receive signals from one or more other sensors. The control module may make decisions for the vehicle based on one or more of the signals.

SUMMARY

A pressure sensor module for a vehicle includes a sensing element module, a sampling module, a filtering module, and a monitoring module. The sensing element module measures a pressure of a fluid and outputs a pressure signal based on the pressure. The sampling module samples the pressure signal. The filtering module receives at least one filter coefficient from a control module and determines a filtered pressure based on at least one of the samples. The monitoring module receives a condition monitoring request from the control module, receives a predetermined value from the control module, and notifies the control module when a condition is satisfied based on a comparison of the predetermined value and one of the filtered pressure and a parameter determined based on the pressure signal.

A method for a vehicle includes measuring a pressure of a fluid using a pressure sensor module; generating a pressure signal based on the pressure using the pressure sensor module, sampling the pressure signal using the pressure sensor module; receiving at least one filter coefficient from a control module using the pressure sensor module; determining a filtered pressure based on at least one of the samples using the pressure sensor module; receiving a condition monitoring request from the control module using the pressure sensor module; receiving a predetermined value from the control module using the pressure sensor module; and, using the pressure sensor module, notifying the control module when a condition is satisfied based on a comparison of the predetermined value and one of the filtered pressure and a parameter determined based on the pressure signal.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5-8 are flowcharts depicting exemplary steps that may be performed by pressure sensor modules according to the principles of the present disclosure.

DETAILED DESCRIPTION

Figure 1:
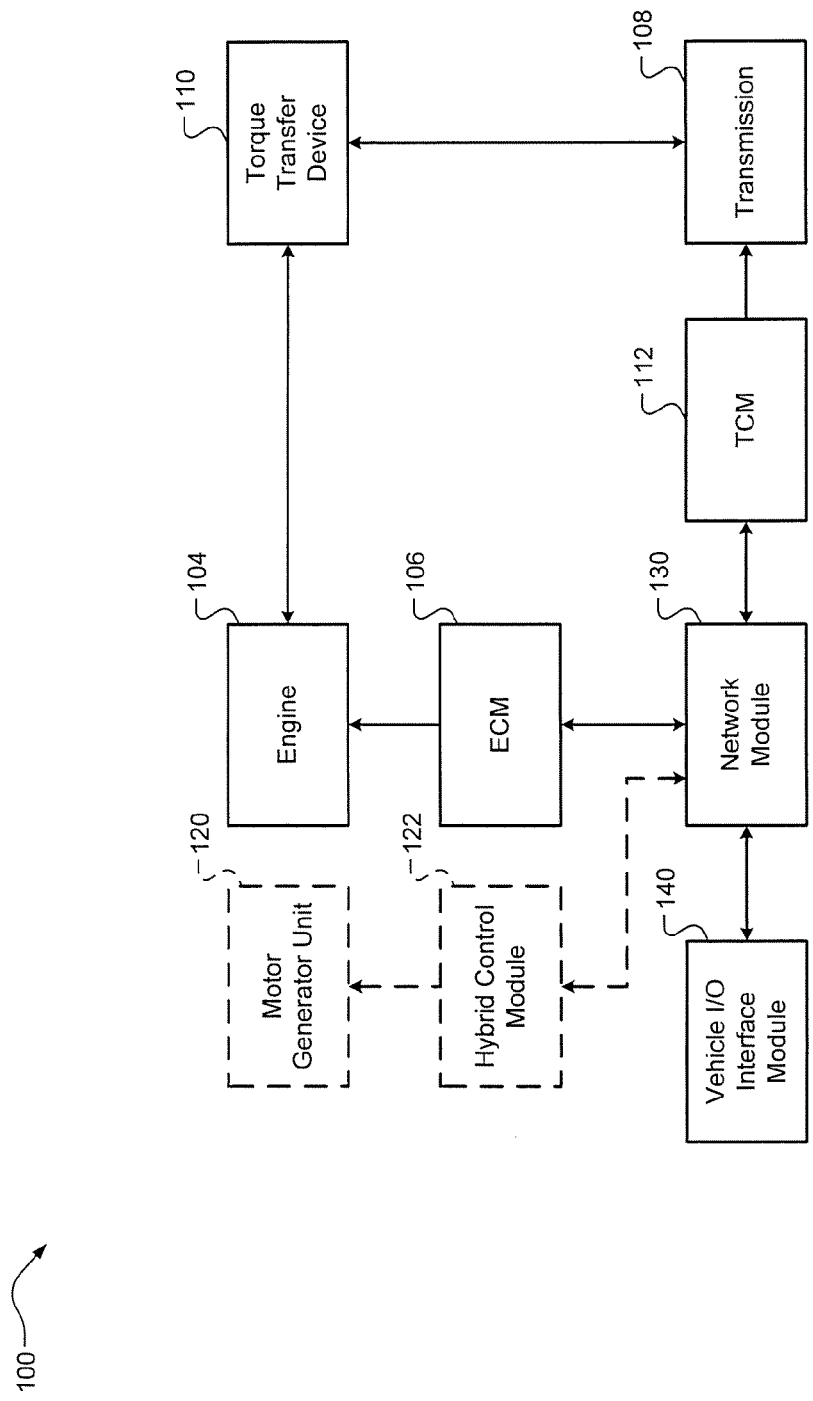
FIG. 1 is a functional block diagram of an exemplary vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A sensor module of a vehicle includes a sensing element that measures a parameter and outputs a signal based on the measured parameter. The sensor module of the present disclosure includes a sampling module that samples the signal. The sensor module filters the samples to determine filtered samples. The control module selectively communicates one or more filter coefficients to the sensor module for the filtering.

The control module may selectively request the sensor module to perform a task. For an example, the control module may request the sensor module to monitor a parameter and determine when a condition is satisfied based on the parameter. The control module may also communicate a predetermined value to the sensor module for use in the determination of when the condition is satisfied. The sensor module monitors the parameter in response to the request and notifies the control module when the condition is satisfied.

For another example, the control module may request the sensor module to perform a statistical analysis of the filtered samples. The control module may communicate a predetermined number of the filtered samples to be used in performing the statistical analysis for such a request. The sensor module may collect the predetermined number of samples and perform the statistical analysis using the predetermined number of samples. The sensor module may communicate a statistical parameter determined from the statistical analysis to the control module.

The control module may also selectively issue a command that causes a change in the parameter being measured by the sensor module. The sensor module monitors the filtered samples after a command is issued and tracks a period between when the command is issued and when the change is reflected in one or more of the filtered samples. The sensor module communicates the period to the control module.

Referring now to FIG. 1, a functional block diagram of an exemplary vehicle system 100 is presented. The vehicle system 100 may include an engine 104 that combusts a mixture of air and fuel to produce drive torque. An engine control module (ECM) 106 may control the torque output of the engine 104.

Torque may be selectively transferred to a transmission 108 via a torque transfer device 110. For example only, the torque transfer device 110 may include a torque converter and/or one or more clutches. A transmission control module (TCM) 112 may control the transmission 108, such as a gear ratio selected within the transmission 108 and other suitable parameters. The TCM 112 may also control the torque transfer device 110.

The vehicle system 100 may also include an electric motor or a motor generator unit 120. One or more additional electric motors or motor generator units may be included. A hybrid control module 122 may control the motor generator unit 120. The motor generator unit 120 may be used to produce torque, to perform regenerative braking and produce electrical energy, and/or to perform other suitable functions.

The ECM 106, the TCM 112, and other vehicle systems may communicate via a network module 130. Devices that are independent of (i.e., external to) the vehicle may interface the network module 130 via a vehicle input/output (I/O) interface module 140. The network module 130 may include, for example, a physical network, a wireless network, a power line communication network, a gateway, and/or another suitable network.

Figure 2:
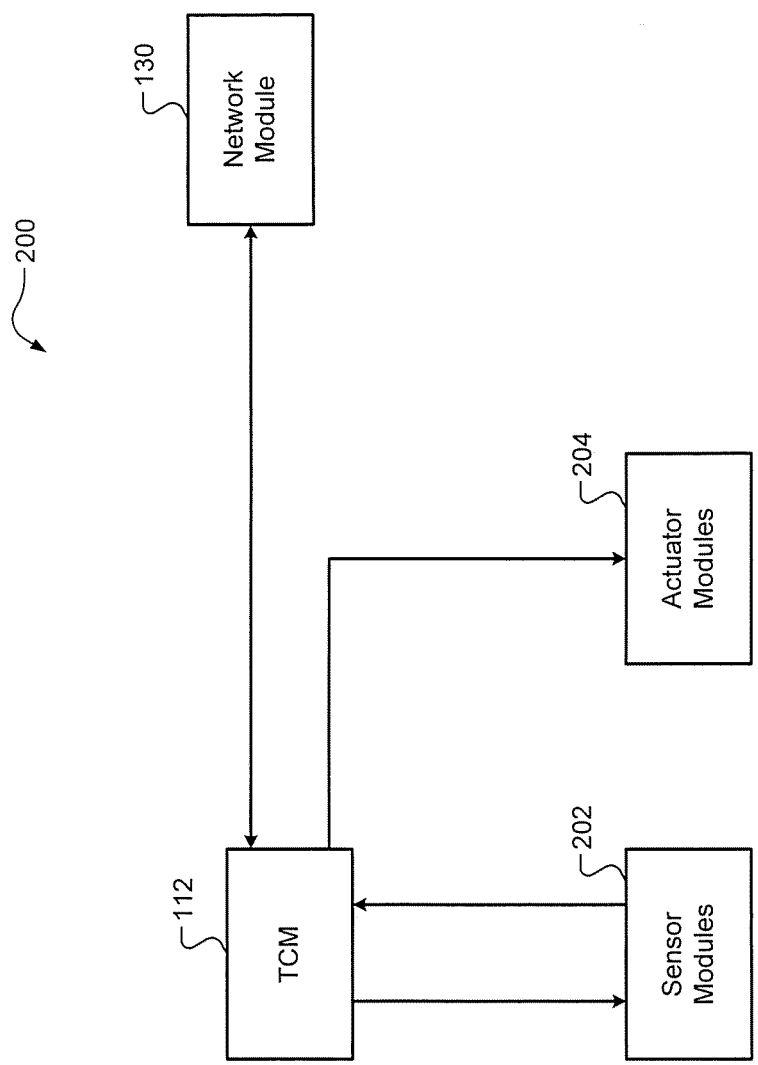
FIGS. 2-3 are functional block diagrams of exemplary transmission control systems according to the principles of the present disclosure.

Referring now to FIG. 2, a functional block diagram of an exemplary implementation of a transmission control system 200 is presented. The TCM 112 may communicate with one or more components in controlling the transmission 108 and/or the torque transfer device 110. For example only, the TCM 112 may communicate with one or more sensor modules 202, one or more actuator modules 204, and other suitable components.

The sensor modules 202 may include, for example, one or more temperature sensors, one or more pressure sensors, one or more position sensors, one or more speed sensors, and/or one or more other suitable sensors. Each of the sensor modules 202 measures an associated parameter and generates a signal based on the measured parameter. For example only, a pressure sensor module (e.g., see FIG. 3) measures pressure and generates a pressure signal based on the measured pressure. The actuator modules 204 may each include, for example, a solenoid, a switch, a valve, a range (i.e., gear) selector, and/or another suitable actuator. For example only, a solenoid may control pressure of a hydraulic fluid at a location. A temperature sensor module and a pressure sensor module may be associated with each solenoid.

In some implementations, the TCM 112, the sensor modules 202, the actuator modules 204, and various connectors may be implemented within a common housing (not shown). The connectors may each include, for example, hydraulic fluid connectors, electrical connectors, and other suitable connectors. The housing containing the TCM 112, the sensor modules 202, the actuator modules 204, the connectors, and other suitable components may be referred to as a transmission electro-hydraulic control module (TEHCM).

The TCM 112 may make control decisions for the operation of the transmission 108. The TCM 112 may also make control decisions for the operation of the torque transfer device 110. For example only, the TCM 112 may control one or more of the actuator modules 204 to control the operation of the transmission 108 and/or the torque transfer device 110.

Generally, the TCM 112 may sample a signal provided by a given sensor at a predetermined sampling rate. For example only, the TCM 112 may sample the value once per 100 ms. The TCM 112 may make the samples available to other vehicle systems and modules via the network module 130.

Figure 3:
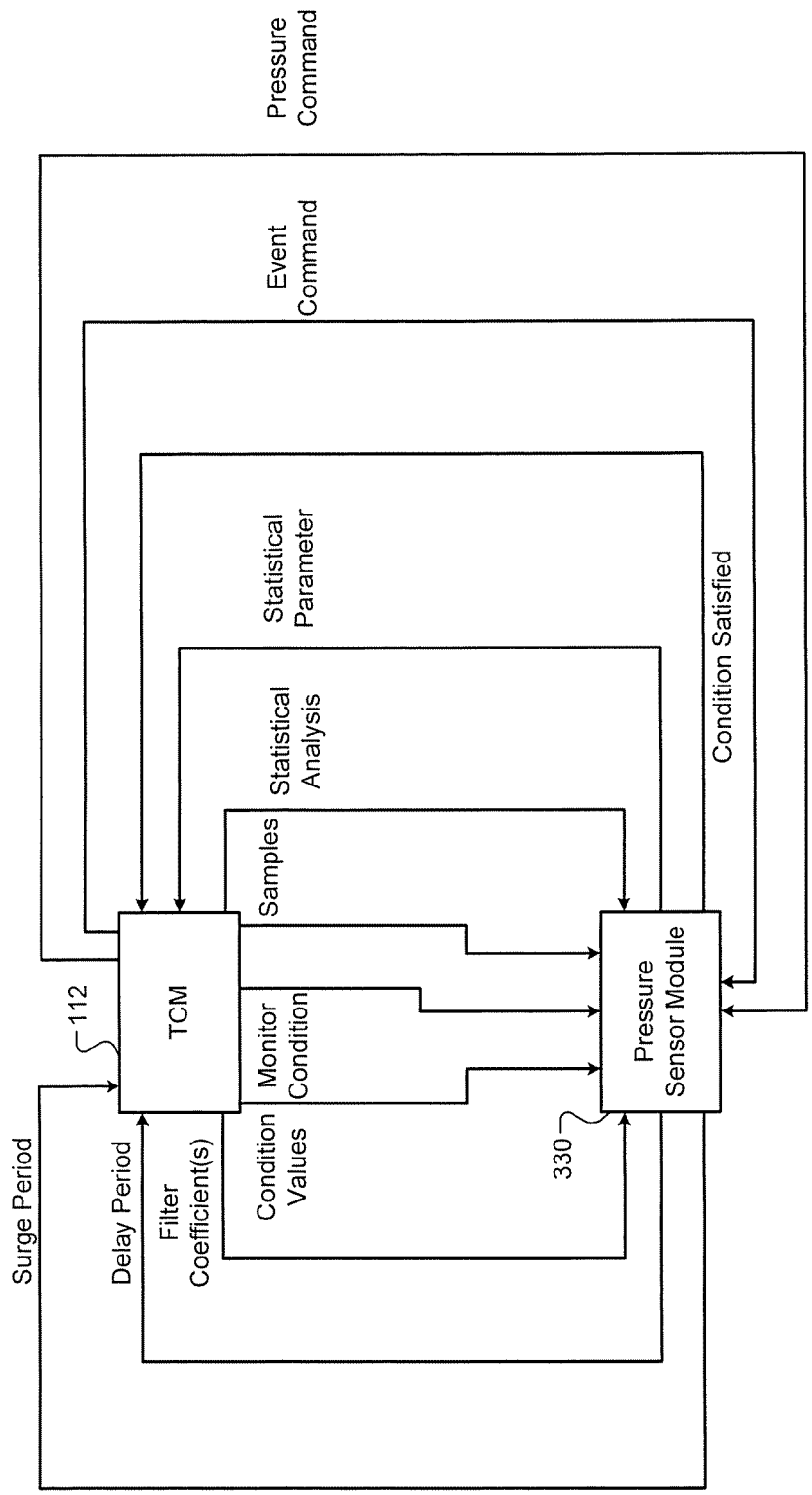

A sensor module according to the present disclosure (as discussed in detail with respect to the exemplary embodiment of FIG. 3) measures a parameter and generates a signal based on the measured parameter. The sensor module samples the signal at another predetermined sampling rate that is more frequent than the sampling rate of the TCM 112. For example only, the sensor module may sample the signal once per µs. The sensor module may apply one or more filters to the samples, and determine filtered samples based on the filter and one or more of the samples. The sensor module may communicate the filtered samples to the TOM 112.

The TCM 112 may selectively request the sensor module to monitor whether a condition is satisfied. The TCM 112 may communicate a condition value associated with the condition to the sensor module. The sensor module may compare a parameter with the condition value, and the sensor module may notify the TCM 112 when the condition is satisfied. As the sampling rate of the sensor module is more frequent than that of the TCM 112, the sensor module may notify the TCM 112 that the condition is satisfied earlier than the TCM 112 may itself determine that the condition is satisfied.

The TCM 112 may additionally or alternatively selectively request the sensor module to perform a statistical analysis of the filtered samples. The TCM 112 may also specify a predetermined number of the filtered samples to be used by the sensor module in performing the statistical analysis. The sensor module performs the statistical analysis using the predetermined number of filtered samples. The sensor module communicates a statistical parameter determined based on the statistical analysis to the TCM 112. As the sampling rate of the sensor module is more frequent than that of the TCM 112, the statistical analysis may be performed using a larger number of the filtered samples than if the statistical analysis was performed by the TCM 112.

Further, each of the samples would necessarily have to be communicated from the sensor module to the TCM 112 if the TCM 112 was to perform the same statistical analysis that is performed by the sensor module. The communication of each of the samples may burden the bandwidth of the TCM 112. The TCM 112 would also have to allocate some of its computational power to the performance of the statistical analysis. By performing the statistical analysis within the sensor module, the sensor module the bandwidth and the computational power of the TCM 112 may be unburdened.

Under some circumstances, the TCM 112 may issue a command that causes a change in the parameter measured by the sensor module. For example only, the TCM 112 may directly command a change in the parameter or the TCM 112 may command an event that will later cause a change in the parameter. The TCM 112 notifies the sensor module when a command is issued. The sensor module monitors the filtered samples and tracks a period between when the command is issued and when one or more of the filtered samples reflect the change. The sensor module communicates the period to the TCM 112. As the sampling rate of the sensor module is more frequent than that of the TCM 112, the period may be a more accurate measurement than if the period were tracked by the TCM 112.

Referring now to FIG. 3, a functional block diagram of an exemplary implementation of the transmission control system 200 is presented. While the present disclosure will be discussed as it relates the TCM 112 and a pressure sensor module 330, the present disclosure may be applicable to other control modules and other types of sensor modules.

The pressure sensor module 330 measures a pressure of a fluid. For example only, the pressure sensor module 330 may measure a pressure of a hydraulic fluid provided by an associated actuator module (not shown). The pressure sensor module 330 generates a pressure signal based on the measured pressure. For example only, the pressure sensor module 330 may generate a current, a voltage, a digital signal, a frequency signal (e.g., pulse width modulation), or another suitable signal, as a function of the measured parameter.

The pressure sensor module 330 may sample the pressure signal at a predetermined sampling rate, such as once per μs. The sampling rate may be variable. The pressure sensor module 330 may apply a filter to one or more of the pressure samples. The pressure sensor module 330 may apply one or more additional filters to the pressure samples. The TCM 112 communicates one or more filter coefficients for the filter to the pressure sensor module 330. The TCM 112 may provide the filter coefficients, for example, each engine startup (e.g., key ON).

The pressure sensor module 330 may determine various parameters based on the pressure signal, the pressure samples, and/or the filtered pressures. For example only, the pressure sensor module 330 may determine a noise characteristic based on the pressure signal or the pressure samples. The pressure sensor module 330 may additionally or alternatively determine a rate of change of the filtered pressures.

The TCM 112 selectively requests the pressure sensor module 330 to monitor when a condition is satisfied. The TCM 112 may request the pressure sensor module 330 to monitor when one or more other conditions are satisfied. For example only, the TCM 112 may request the pressure sensor module 330 to monitor when the filtered pressure crosses a predetermined pressure, when the rate of change crosses a predetermined rate of change, and/or when the noise characteristic crosses a predetermined value.

The TCM 112 may make a request via a monitor condition signal. The TCM 112 may request monitoring of a given condition by setting the monitor condition signal based on the condition. The TCM 112 may request monitoring for another condition using the monitor condition signal or another signal.

The TCM 112 also transmits a condition value to the pressure sensor module 330 for use in determining whether the condition is satisfied. For example only, the TCM 112 may transmit the predetermined pressure, the predetermined rate of change, and/or the predetermined value to the pressure sensor module 330. The condition value associated with a given condition may be variable. For example only, the TCM 112 may select the condition value for the given condition from a mapping of predetermined condition values.

The pressure sensor module 330 notifies the TCM 112 when the condition is satisfied. The pressure sensor module 330 may notify the TCM 112 when the condition is satisfied via a condition satisfied signal. For example only, the pressure sensor module 330 may set the condition satisfied signal to an active state (e.g., 5 V) when the condition is satisfied. Until the condition is satisfied, the condition satisfied signal may remain in an inactive state (e.g., 0 V).

In some circumstances, the TCM 112 may request the pressure sensor module 330 to perform a statistical analysis of the filtered pressures. For example only, the TCM 112 may request performance of a statistical analysis when a clutch (not shown) of the torque transfer device 110 is in an applied state after a gear shift event. The TCM 112 may request performance of the statistical analysis via a statistical analysis signal. The TCM 112 may specify a type of statistical analysis to be performed by setting the statistical analysis signal based on the type of statistical analysis.

The TCM 112 may also request that the pressure sensor module 330 collect and use a predetermined number of samples for the statistical analysis. The TCM 112 may communicate the predetermined number of samples to the pressure sensor module 330 using a samples signal. For example only, the TCM 112 may set the samples signal based on the predetermined number of samples. The predetermined number of samples may be variable.

The pressure sensor module 330 collects the predetermined number of the filtered pressures and performs the requested statistical analysis using the predetermined number of the filtered pressures. The pressure sensor module 330 determines a statistical parameter based on the statistical analysis of the filtered pressures. The pressure sensor module 330 communicates the statistical parameter to the TCM 112.

Under some circumstances, the TCM 112 may issue one or more commands that may cause a change in the pressure being measured by the pressure sensor module 330. For a first example only, the TCM 112 may selectively command an increase in the pressure under some circumstances. For example only, the TCM 112 may command one or more of the actuator modules 204 to adjust to increase the pressure. For a second example only, the TCM 112 may selectively command performance of an event. For example only, the TCM 112 may command one or more of the actuator modules 204 to adjust to perform the event. Performance of the event will cause a change in the pressure being measured by the pressure sensor module 330.

The TCM 112 may notify the pressure sensor module 330 when a pressure change command or an event command is issued via a pressure command signal and an event command signal, respectively. For example only, the TCM 112 may set the pressure command signal to an active state (e.g., 5 V) when a pressure change is commanded, and the TCM 112 may set the event command signal to an active state (e.g., 5 V) when an event that will cause an increase in the pressure is commanded.

The pressure sensor module 330 may monitor the filtered pressures received after the command is issued. More specifically, the pressure sensor module 330 tracks a period between when the command is issued and when one or more of the filtered pressures reflect the pressure change. For example only, the pressure sensor module 330 may determine a period between when a pressure command is issued and when the pressure change is reflected in one or more of the filtered pressures. This period may be referred to as a delay period.

The pressure sensor module 330 may additionally or alternatively determine a period between when an event command is issued and when the associated pressure change is reflected in one or more of the filtered pressures. This period may be referred to as a surge period.

The pressure sensor module 330 communicates the delay period to the TCM 112 after the TCM 112 issues a pressure command. The pressure sensor module 330 communicates the surge period to the TCM 112 after the TCM 112 issues an event command. The TCM 112 may make one or more control decisions based on one or more of these periods. For example only, the TCM 112 may adjust the time at which the TCM 112 issues future pressure commands and event commands based on the delay period and the surge period, respectively.

Figure 4:
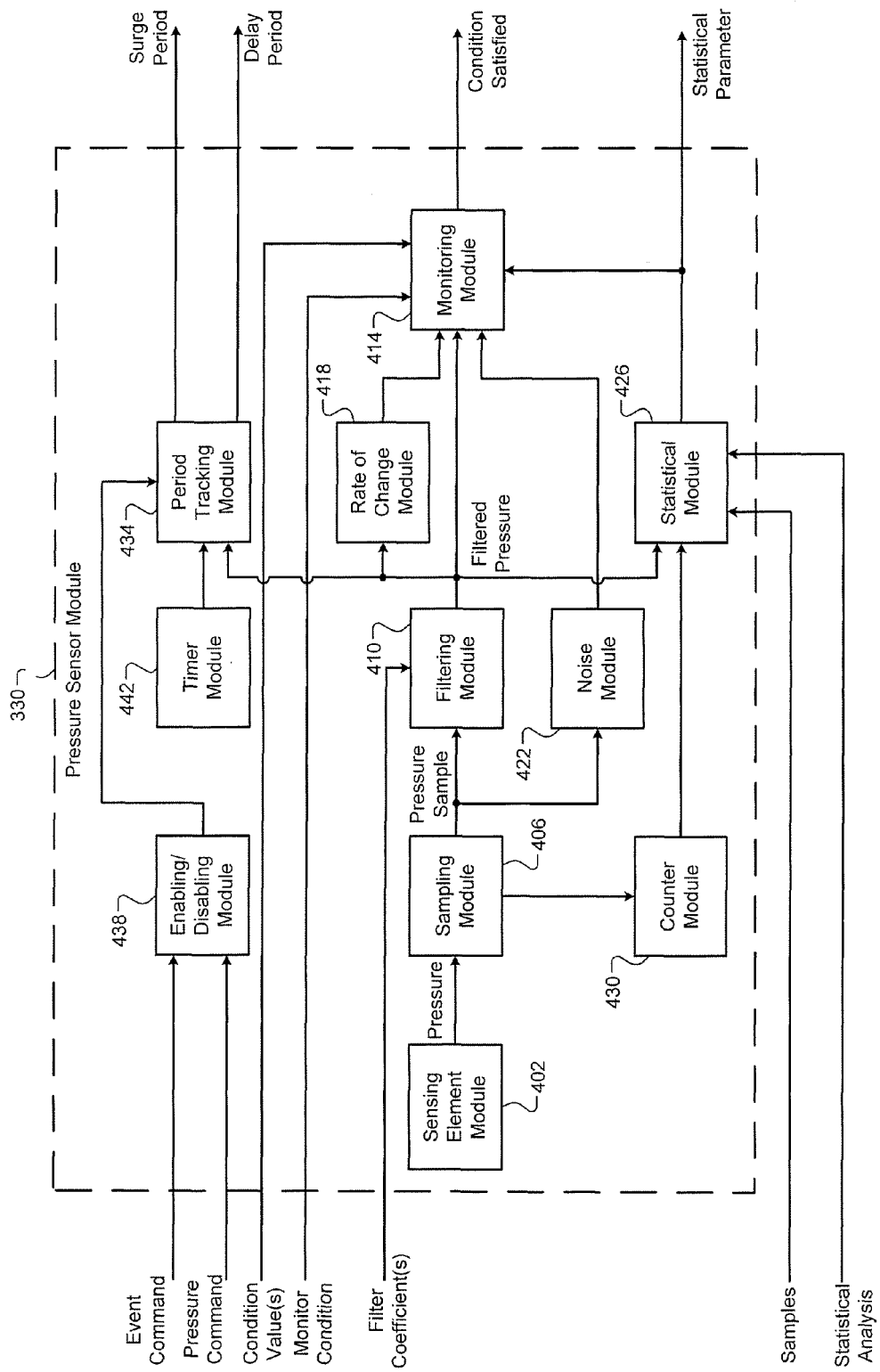
FIG. 4 is a functional block diagram of an exemplary pressure sensor module according to the principles of the present disclosure.

Referring now to FIG. 4, a functional block diagram of an exemplary implementation of the pressure sensor module 330 is presented. The pressure sensor module 330 may include a sensing element module 402, a sampling module 406, a filtering module 410, and a monitoring module 414. The pressure sensor module 330 may also include a rate of change module 418, a noise module 422, a statistical module 426, and a counter module 430. The pressure sensor module 330 may also include a period tracking module 434, an enabling/disabling module 438, and a timer module 442.

The sensing element module 402 measures the pressure and generates the pressure signal based on the measured pressure. For example only, the pressure signal may include a current signal, and the sensing element module 402 may set a magnitude or a frequency of the signal based on the measured pressure.

The sampling module 406 selectively samples the pressure signal and outputs samples of the pressure signal. In other words, the sampling module 406 outputs pressure samples. The sampling module 406 may sample the pressure signal at a predetermined sampling rate, such as once every µs. The sampling module 406 provides the pressure samples to the filtering module 410.

The filtering module 410 applies a filter to one or more of the pressure samples. For example only, the filter may include a digital filter, a Kalman filter, a neural network, a deterministic estimator, a stochastic estimator, a digital approximation of a filter, or another suitable type of filter, observer, or estimator. The TCM 112 provides the filter coefficients for the filter to the filtering module 410. The TCM 112 may provide the filter coefficients, for example, each engine startup (e.g., key ON), after each predetermined period, after the occurrence of one or more predetermined events, etc.

The monitoring module 414 may receive the monitor condition signal from the TCM 112. In other words, the monitoring module 414 may receive a request from the TCM 112 to monitor whether a given condition is satisfied. For example only, the TCM 112 may request that the monitoring module 414 monitor whether a rate of change of the filtered pressure has crossed a predetermined rate of change, whether the filtered pressure has crossed a predetermined pressure, whether a noise characteristic of the pressure signal has crossed a predetermined value, or whether another condition is satisfied. The TCM 112 may request monitoring of one or more conditions at a given time.

The rate of change module 418 may determine the rate of change based on two or more of the filtered pressures. For example only, the rate of change module 418 may determine the rate of change based on a gradient of the filtered pressures, a quotient of a difference between two filtered pressures and the sampling rate, or another suitable rate of change. The rate of change module 418 may determine the rate of change based on a derivative of the pressure signal in other implementations.

The noise module 422 may determine one or more noise characteristics of the pressure signal. For example only, a noise characteristic may include a noise spectrum, a noise frequency, or a noise magnitude. For example only, the noise module 422 may determine the noise frequency based on a Fast Fourier Transform (FFT), through a correlation function, a continuous or discrete time filter, or in another suitable manner. The noise module 422 may determine the noise magnitude based on a statistical analysis, a model based analysis, a neural network, or in another suitable manner. The noise spectrum may be based on the noise frequency and the noise magnitude collectively.

The monitoring module 414 may receive the filtered pressure from the filtering module 410, the rate of change from the rate of change module 418, and the noise characteristic from the noise module 422. The monitoring module 414 may determine whether the condition that the TCM 112 requested be monitored is satisfied based a comparison of a parameter and an associated condition value received from the TCM 112. The monitoring module 414 notifies the TCM 112 when the condition being monitored is satisfied. For example only, the monitoring module 414 may set the condition satisfied signal to indicate the condition being monitored and that the condition is satisfied.

The statistical module 426 performs the statistical analysis after receiving the request from the TCM 112 for the performance of the statistical analysis. For example only, the TCM 112 may request the performance of the statistical analysis when the clutch is in the applied state after a gear shift is executed within the transmission 108. The TCM 112 communicates the predetermined number of filtered pressures to be used in the performance of the statistical analysis via the samples signal. The predetermined number may be variable.

The statistical module 426 collects the predetermined number of the filtered pressures after the request is received from the TCM 112. The statistical module 426 may store each filtered pressure generated by the filtering module 410 after the request is received from the TCM 112. A counter value in the counter module 430 may be incremented each time when the filtered pressure is generated by the filtering module 410.

The statistical module 426 may monitor the counter value and perform the statistical analysis using the stored filtered pressures when the counter value reaches the predetermined number. The statistical analysis performed may include determining, for example, a mean of the predetermined number of filtered pressures, a standard deviation of the predetermined number filtered pressures, an N-th moment of a probability distribution of the predetermined number of filtered pressures, a variance of the predetermined number of filtered pressures, a skewness of the predetermined number of filtered pressures, or a kurtosis of the predetermined number of filtered pressure, or another suitable statistical analysis. The statistical module 426 determines a statistical parameter based on the statistical analysis and provides the statistical parameter to the TCM 112.

The enabling/disabling module 438 selectively enables the period tracking module 434 when the TCM 112 has issued at least one of a pressure command and an event command. The enabling/disabling module 438 may also enable the timer module 442. A timer in the timer module 442 may be incremented as time passes after a command is issued. In this manner, the timer tracks the period of time that has passed since the TCM 112 issued a command.

The period tracking module 434 may monitor the timer and the filtered pressure when enabled. The period tracking module 434 may communicate the period indicated by the timer when the filtered pressure changes. For example only, the period tracking module 434 may communicate the period to the TCM 112 when the filtered pressure changes by more than a predetermined amount or percentage or when the filtered pressure reflects another suitable change in the pressure. When the TCM 112 issued an event command, the period tracking module 434 communicates the surge period to the TOM 112. The period tracking module 434 communicates the delay period to the TCM 112 when the TCM 112 issued a pressure command.

Figure 5:
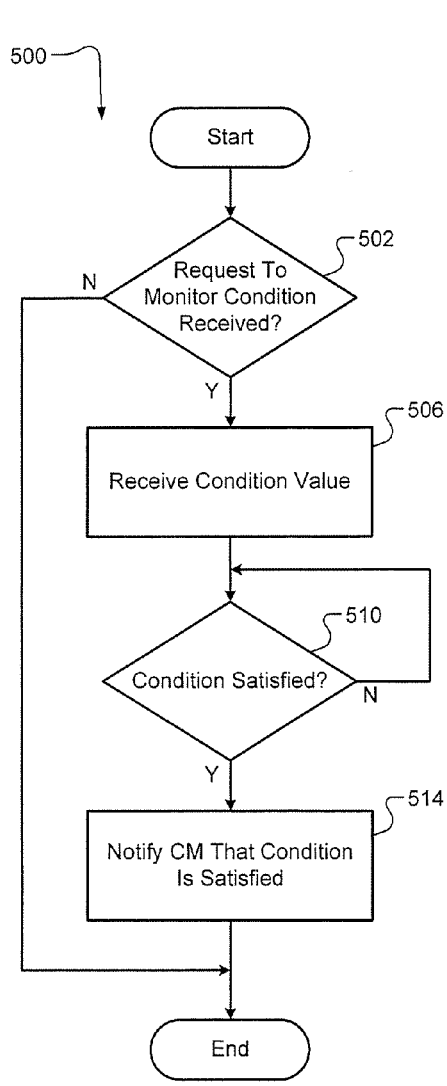

FIGS. 5, 6, 7, and 8 are flowcharts depicting exemplary steps 500, 600, 700, and 800, respectively, that may be performed by a pressure sensor module. Referring now to FIG. 5, control may begin in step 502 where the pressure sensor module determines whether the pressure sensor module has received a request to monitor a condition from a control module (CM). If true, control may continue to step 506; if false, control may end.

In step 506, the pressure sensor module may receive a condition value associated with the condition that the CM requested be monitored. The pressure sensor module may determine whether the condition is satisfied in step 510. If true, the pressure sensor module may notify the CM that the condition is satisfied in step 514, and control may end. If false, control may remain in step 510. For example only, the pressure sensor module may determine that the condition is satisfied when a parameter crosses the condition value.

Figure 6:
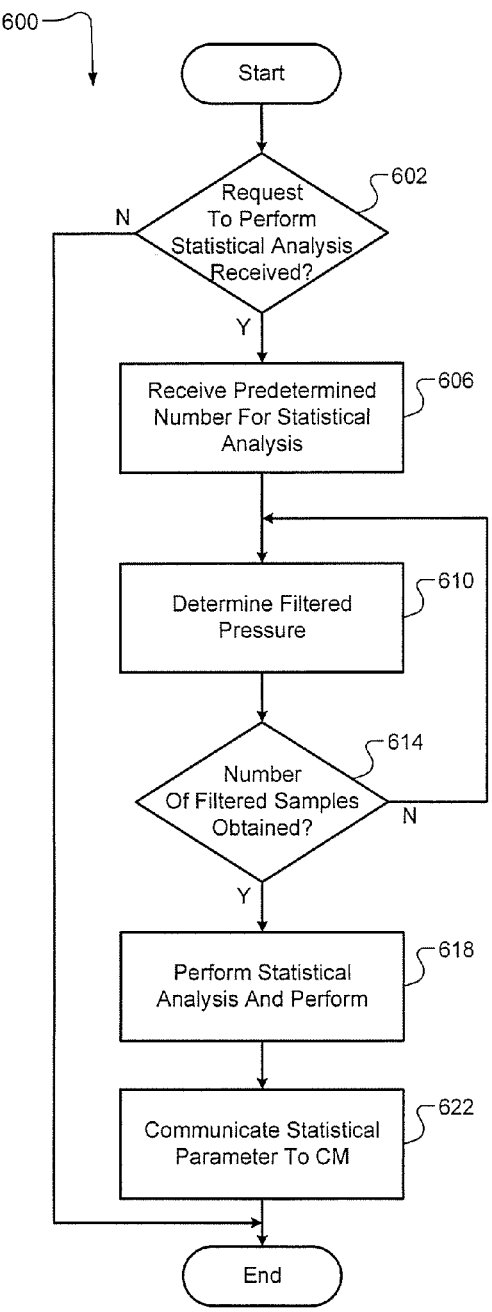

Referring now to FIG. 6, control may begin in step 602 where the pressure sensor module determines whether a request to perform a statistical analysis has been received from a CM. If true, control may continue to step 606; if false, control may end. The pressure sensor module may receive a predetermined number for the statistical analysis in step 606.

In step 610, the pressure sensor module may determine a filtered pressure. The pressure sensor module may determine the filtered pressure via application of a filter to one or more pressure samples. The pressure sensor module may determine whether the pressure sensor module has obtained the predetermined number of filtered pressures in step 614. If true, control may proceed to step 618; if false, control may return to step 610 and determine another filtered pressure.

The pressure sensor module may perform the statistical analysis in step 618. In other words, the pressure sensor module may determine a statistical parameter from the statistical analysis based on the predetermined number of filtered pressures in step 618. The pressure sensor module communicates the statistical parameter to the CM in step 622, and control may end.

Referring now to FIG. 7, control may begin in step 702 where the pressure sensor module determines whether a control module (CM) has issued an event command. If true, control may proceed to step 706; if false, control may end. The performance of the event commanded will cause a change in the pressure being measured by the pressure sensor module.

In step 706, the pressure sensor module may increment a timer. The pressure sensor module may also reset the timer to a predetermined reset value (e.g., zero) before incrementing the timer for a first time in step 706. The pressure sensor module may determine whether the filtered pressure reflects the change in step 710. If true, control may continue to step 714; if false, control may return to step 706. In this manner, the timer tracks the period of time elapsed since the CM issued the event command. The pressure sensor module reads the surge period from the timer and communicates the surge period to the CM in step 714. In this manner, the pressure sensor module reads the surge period from the timer when the filtered pressure reflects the pressure change and communicates the surge period to the CM. Control may end.

Referring now to FIG. 8, control may begin in step 802 where a pressure sensor module determines whether a control module (CM) has issued a pressure command. If true, control may proceed to step 806; if false, control may end. The CM has commanded a change in the pressure being measured by the pressure sensor module by issuing the pressure command.

In step 806, the pressure sensor module may increment a timer. The pressure sensor module may also reset the timer to a predetermined reset value (e.g., zero) before incrementing the timer for a first time in step 806. The pressure sensor module may determine whether the filtered pressure reflects the change in step 810. If true, control may continue to step 814; if false, control may return to step 806. In this manner, the timer tracks the period of time elapsed since the CM issued the pressure command. The pressure sensor module reads the delay period from the timer and communicates the delay period to the CM in step 814. In this manner, the pressure sensor module reads the delay period from the timer when the filtered pressure reflects the pressure change and communicates the delay period to the CM. Control may end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A pressure sensor module for a vehicle, comprising:
   a sensing element module that measures a pressure of a fluid and that outputs a pressure signal based on the pressure;
   a sampling module that samples the pressure signal;
   a filtering module that receives at least one filter coefficient from a control module and that determines a filtered pressure based on at least one of the samples; and
   a monitoring module that receives a condition monitoring request from the control module, that receives a predetermined value from the control module, and that notifies the control module when a condition is satisfied based on a comparison of the predetermined value and one of the filtered pressure and a parameter determined based on the pressure signal.

2. A control system comprising:
   the pressure sensor module of claim 1; and
   the control module that selectively communicates the at least one filter coefficient to the pressure sensor module, that selectively communicates the condition monitoring request to the pressure sensor module, that selectively communicates the predetermined value to the pressure sensor module, and that receives the notification from the pressure sensor module.

3. The control system of claim 2 wherein the control module controls operation of a transmission.

4. The pressure sensor module of claim 1 wherein the predetermined value is a predetermined pressure, and
   wherein the monitoring module selectively notifies the control module when the condition is satisfied based on a comparison of the filtered pressure and the predetermined pressure.

5. The pressure sensor module of claim 1 further comprising a rate of change module that determines a rate of change of the filtered pressure, wherein the predetermined value is a predetermined rate of change, and wherein the monitoring module selectively notifies the control module when the condition is satisfied based on a comparison of the rate of change and the predetermined rate of change.

6. The pressure sensor module of claim 1 further comprising a noise module that determines a noise characteristic based on one of the pressure signal and at least one of the samples, wherein the predetermined value is a predetermined noise value, and wherein the monitoring module selectively notifies the control module when the condition is satisfied based on a comparison of the noise characteristic and the predetermined noise value.

7. The pressure sensor module of claim 6 wherein the noise characteristic is a noise frequency, and wherein the predetermined value is a predetermined frequency.

8. The pressure sensor module of claim 6 wherein the noise characteristic is a noise magnitude, and wherein the predetermined value is a predetermined magnitude.

9. The pressure sensor module of claim 1 further comprising a statistical module that receives a statistical analysis request from the control module, that receives a predetermined number from the control module, that determines a statistical parameter based on a statistical analysis of the predetermined number of samples of the filtered pressure determined after the receipt of the statistical analysis request, and that communicates the statistical parameter to the control module.

10. The pressure sensor module of claim 1 further comprising a period tracking module that monitors a period between when the control module issues a command and when the filtered pressure changes in response to the command and that communicates the period to the control module.

11. The pressure sensor module of claim 1 wherein the predetermined value is a predetermined pressure, and wherein the monitoring module selectively notifies the control module when the condition is satisfied based on a comparison of the pressure signal and the predetermined pressure.

12. A method for a vehicle, comprising:

measuring, using a pressure sensor module, a pressure of a fluid;

generating, using the pressure sensor module, a pressure signal based on the pressure;

sampling, using the pressure sensor module, the pressure signal;

receiving, using the pressure sensor module, at least one filter coefficient from a control module;

determining, using the pressure sensor module, a filtered pressure based on at least one of the samples;

receiving, using the pressure sensor module, a condition monitoring request from the control module;

receiving, using the pressure sensor module, a predetermined value from the control module; and, using the pressure sensor module, notifying the control module when a condition is satisfied based on a comparison of the predetermined value and one of the filtered pressure and a parameter determined based on the pressure signal.

13. The method of claim 12 further comprising controlling operation of a transmission using the control module.

14. The method of claim 12 wherein the receiving the predetermined value from the control module comprises receiving a predetermined pressure, and wherein the notifying comprises notifying the control module when the condition is satisfied based on a comparison of the filtered pressure and the predetermined pressure.

15. The method of claim 12 further comprising determining a rate of change of the filtered pressure, wherein the receiving the predetermined value from the control module comprises receiving a predetermined rate of change, and wherein the notifying comprises notifying the control module when the condition is satisfied based on a comparison of the rate of change and the predetermined rate of change.

16. The method of claim 12 further comprising determining a noise characteristic based on one of the pressure signal and at least one of the samples, wherein the receiving the predetermined value from the control module comprises receiving a predetermined noise value, and wherein the notifying comprises notifying the control module when the condition is satisfied based on a comparison of the noise characteristic and the predetermined noise value.

17. The method of claim 16 wherein the determining the noise characteristic comprises determining a noise frequency, and wherein the receiving the predetermined value from the control module comprises receiving a predetermined frequency.

18. The method of claim 16 wherein the determining the noise characteristic comprises determining a noise magnitude, and wherein the receiving the predetermined value from the control module comprises receiving a predetermined magnitude.

19. The method of claim 12 further comprising:

receiving, using the pressure sensor module, a statistical analysis request from the control module;

receiving, using the pressure sensor module, a predetermined number from the control module;

determining a statistical parameter based on a statistical analysis of the predetermined number of samples of the filtered pressure determined after the receipt of the statistical analysis request; and communicating, using the pressure sensor module, the statistical parameter to the control module.

20. The method of claim 12 further comprising:

monitoring, using the pressure sensor module, a period between when the control module issues a command and when the filtered pressure changes in response to the command; and communicating, using the pressure sensor module, the period to the control module.

* * * * *